(12) United States Patent
Beltran

(10) Patent No.: US 11,104,480 B2
(45) Date of Patent: Aug. 31, 2021

(54) SCOOP ATTACHING DEVICE

(71) Applicant: Mary Beltran, The Bronx, NY (US)

(72) Inventor: Mary Beltran, The Bronx, NY (US)

( * ) Notice: Subject to any disclaimer, the term of this patent is extended or adjusted under 35 U.S.C. 154(b) by 100 days.

(21) Appl. No.: 16/775,343

(22) Filed: Jan. 29, 2020

(65) Prior Publication Data
US 2020/0165033 A1    May 28, 2020

Related U.S. Application Data

(63) Continuation-in-part of application No. 15/205,864, filed on Jul. 8, 2016, now abandoned.

(60) Provisional application No. 62/199,652, filed on Jul. 31, 2015.

(51) Int. Cl.
*B65D 21/02*    (2006.01)
*G01F 19/00*    (2006.01)

(52) U.S. Cl.
CPC ....... *B65D 21/0233* (2013.01); *G01F 19/002* (2013.01); *B65D 2313/04* (2013.01)

(58) Field of Classification Search
CPC ............ B65D 21/0233; B65D 2313/04; A47G 2200/10; A47G 2200/106; G01F 19/002
USPC .......................................................... 220/514
See application file for complete search history.

(56) References Cited

U.S. PATENT DOCUMENTS

| | | | | |
|---|---|---|---|---|
| 4,720,023 A | * | 1/1988 | Jeff .................... | A47G 19/2288 215/12.1 |
| 6,296,210 B1 | * | 10/2001 | Kelley .................. | A47F 5/0006 248/222.14 |
| 6,756,543 B1 | * | 6/2004 | Kaloustian ............. | H01R 13/72 174/135 |
| 2004/0173719 A1 | * | 9/2004 | Mitchell ............ | A47G 23/0225 248/311.2 |
| 2010/0089151 A1 | * | 4/2010 | Mantilla ............ | B65D 21/0233 73/426 |

* cited by examiner

*Primary Examiner* — Jeffrey R Allen
(74) *Attorney, Agent, or Firm* — Bruce A. Lev

(57) ABSTRACT

A scoop attaching device is a set of nestable measuring cups with attachable magnets, which allow each cup to store within the next larger size cup and stay together while being stored on the lid within a storage container, keeping the measuring cups out of the storage container material until ready for use.

12 Claims, 4 Drawing Sheets

SCOOP ATTACHING DEVICE

CROSS-REFERENCE TO RELATED APPLICATION

The present application is related to and claims priority from prior provisional application Ser. No. 62/199,652, filed Jul. 31, 2015; and prior non-provisional application Ser. No. 15/205,864, filed Jul. 8, 2016, which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of utensils and more specifically relates to a measuring cup storage system.

2. Description of the Related Art

A measuring spoon or cup is a spoon/cup used to measure an amount of an ingredient, either liquid or dry, when cooking. In addition, the measuring scoop is often used to remove a portion of an ingredient from a container. Furthermore, the measuring scoop is typically stored inside the container and within the powder inside the container. For instance, the body of the measuring scoop is inserted into the powder and the handle is exposed so that a user can grasp and pull the measuring scoop out from the container. But often the handle ends up in the powder, and the user is forced to dig the scoop out of the powder.

Various attempts have been made to solve the above-mentioned problems such as those found in U.S. Design Pat. No. D437793 to Sascha Kaposi et. al.; U.S. Pat. No. 3,526,138 to Smith Sidney Z. and Swett James B.; and U.S. Publication No. 20080017540 to Ravi Sawhney et. al. This art is representative of measuring devices. None of the above inventions and patents, taken either singly or in combination, is seen to describe the invention as claimed.

Ideally, a set of measuring cups should provide ease of use, storage within each other for space constraints, and yet would operate reliably and be manufactured at a modest expense. Thus, a need exists for a reliable scoop attaching device to avoid the above-mentioned problems.

BRIEF SUMMARY OF THE INVENTION

In view of the foregoing disadvantages inherent in the known measuring cup art, the present invention provides a novel scoop attaching device. The general purpose of the present invention, which will be described subsequently in greater detail is to provide a measuring cup system which stores one within the other via magnetic properties, and stores within a storage container on the lid to keep the measuring cups out of the storage container material.

A scoop attaching device, comprising: a scoop having at least one magnetism attracting part and a body having a bottom part and a surrounding part. The bottom part and the surrounding part constitute a holding part, with the holding part having an opening, and a magnetism attracting device having a first magnetic part and a second magnetic part. The first magnetic part and second magnetic part are magnetically attracted and connected to each other, and the second magnetic part and magnetism attracting part are magnetically attracted and connected to each other.

There is a first magnetic force between the first magnetic part and second magnetic part, and there is a second magnetic force between the second magnetic part of the magnetism attracting device and the magnetism attracting part of the scoop, with the magnetism attracting device having twice the volume of the magnetism attracting part, and the first magnetic force being greater than the second magnetic force.

The surrounding part has a handle attached thereto in a direction away from the body, with the magnetism attracting part attached at a location on the surrounding part spaced from the handle, the magnetism attracting part is formed having a flat, vertical surface.

The bottom part, surrounding part, and handle are all formed from plastic material. The magnetism attracting part is embedded in, and protruding from the surrounding part at spaced intervals. The magnetism attracting part is round, and connected to the surrounding part at spaced intervals.

The present invention holds significant improvements and serves as a scoop attaching device. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, scoop attaching device constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to kitchen utensils and more particularly to a scoop attaching device as used to improve the ability of a user to store a set of measuring cups within a storage container via magnetic properties which attach the measuring cups to the storage container lid and keep the measuring cups out of storage container material.

Generally speaking, a scoop attaching device is a set of measuring cups with attachable magnets, which allow each cup to store within the next larger size cup and stay together while being stored on the lid within a storage container until ready for use.

Figure 1:
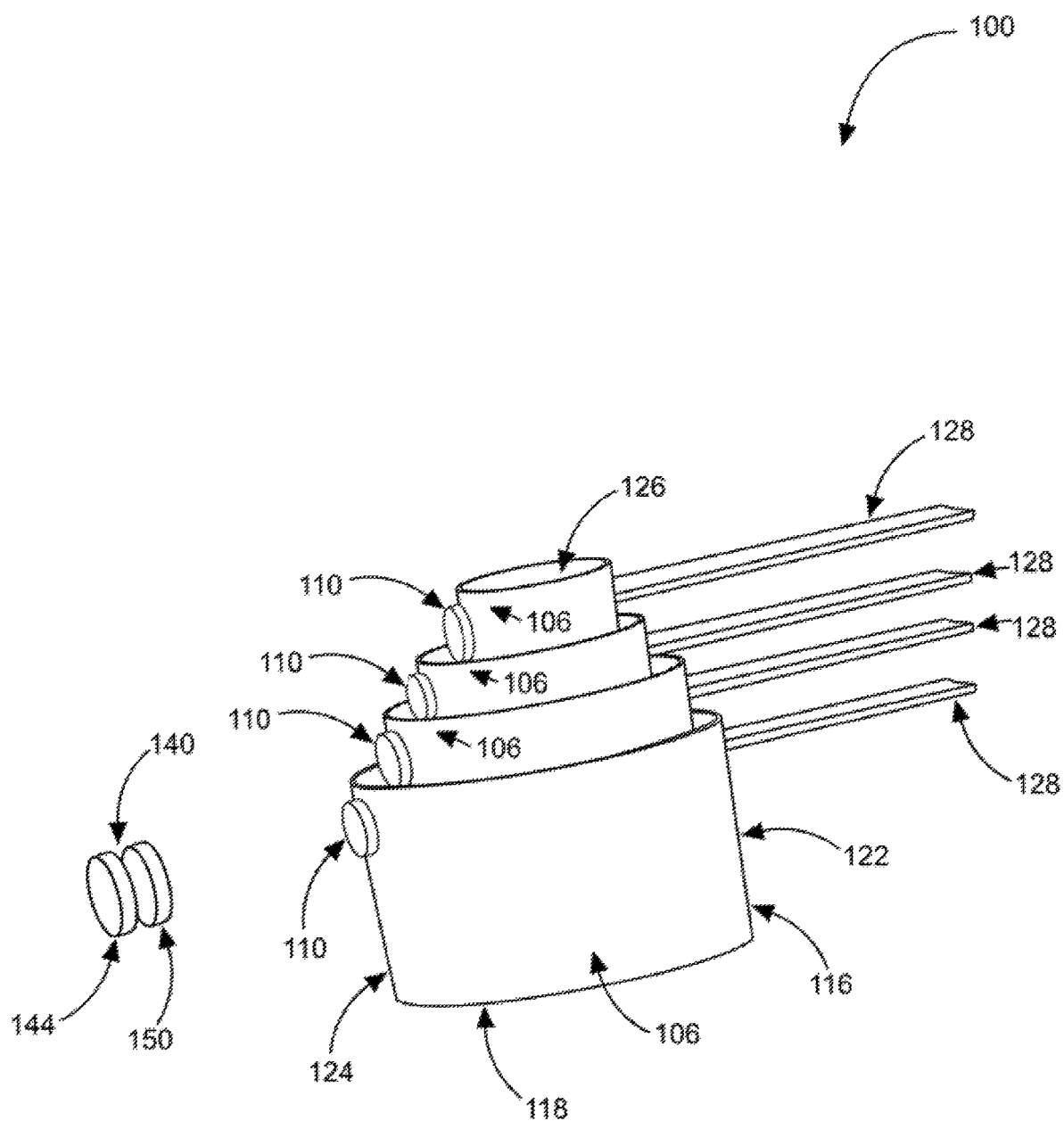
FIG. 1 shows a perspective view illustrating a scoop attaching device according to an embodiment of the present invention.

Referring to the drawings by numerals of reference there is shown in FIG. 1, a perspective view illustrating a scoop attaching device 100 according to an embodiment of the present invention.

Scoop attaching device 100, comprising a scoop 106 having at least one magnetism attracting part 110 and body 116 having bottom part 118 and surrounding part 122. Bottom part 118 and surrounding part 122 constitute holding part 124, with holding part 124 having opening 126, and a magnetism attracting device 140 having first magnetic part 144 and second magnetic part 150. First magnetic part 144 and second magnetic part 150 are magnetically attracted and connected to each other, and second magnetic part 150 and magnetism attracting part 110 are magnetically attracted and connected to each other.

Figure 2:
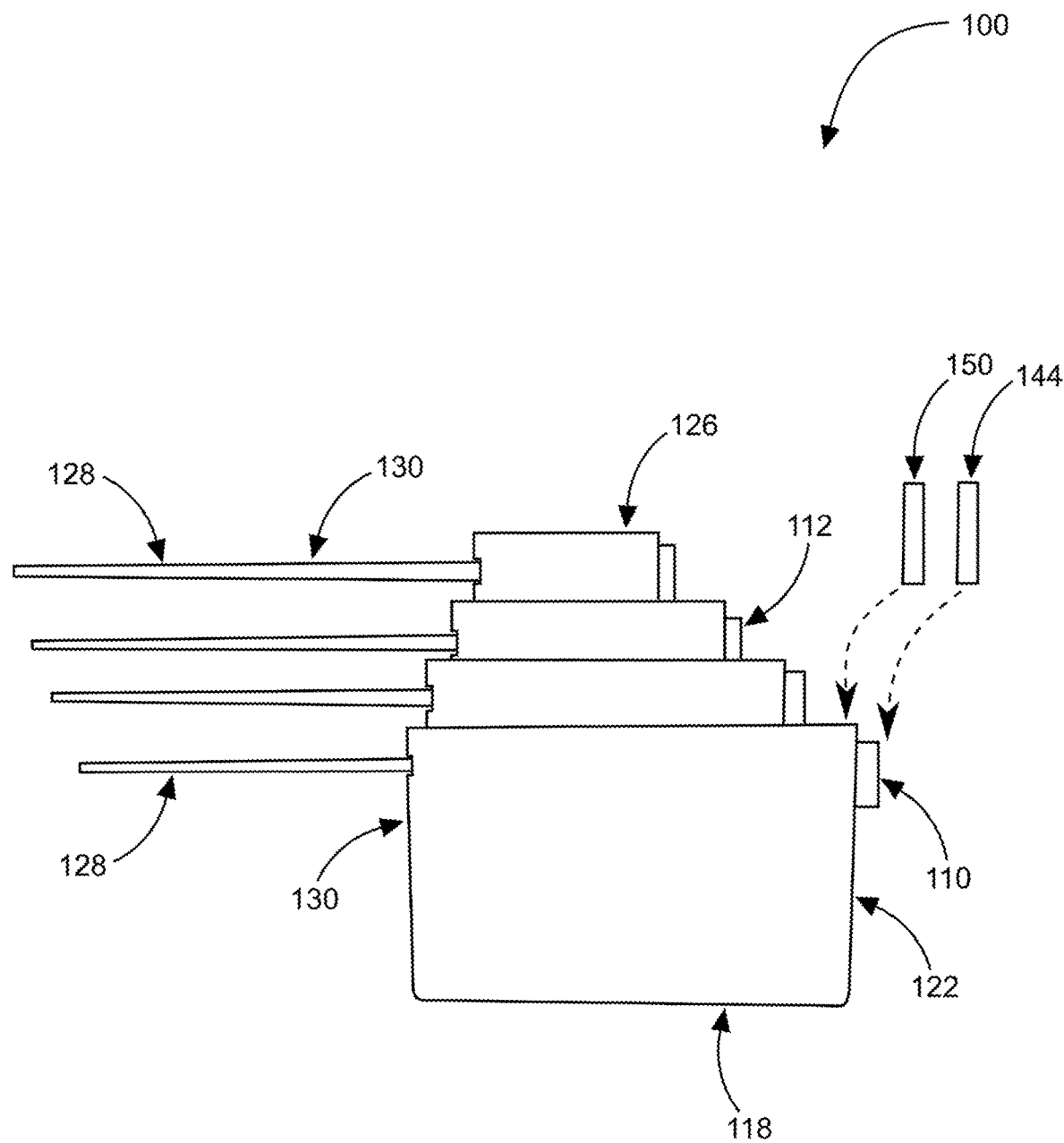
FIG. 2 is a side view illustrating a scoop attaching device according to an embodiment of the present invention of FIG. 1.

Referring now to FIG. 2, a side view illustrating scoop attaching device 100 according to an embodiment of the present invention.

There is a first magnetic force between first magnetic part 144 and second magnetic part 150, and there is a second magnetic force between second magnetic part 150 of the magnetism attracting device 140 and magnetism attracting part 110 of scoop 106, with magnetism attracting device 140 having twice the volume of magnetism attracting part 110, and the first magnetic force being greater than the second magnetic force.

Figure 3:
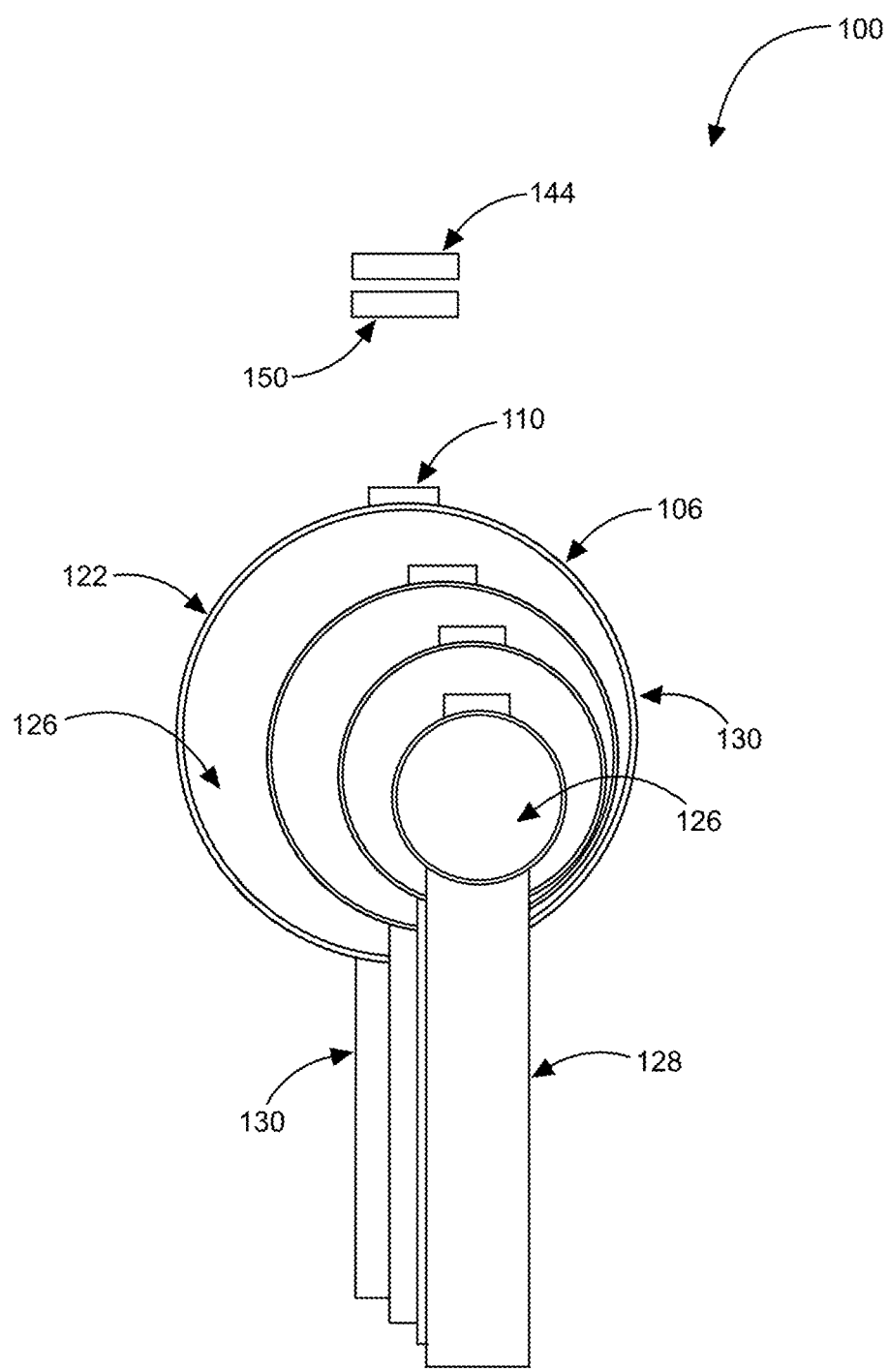
FIG. 3 is a top view illustrating scoop attaching device according to an embodiment of the present invention of FIG. 1.

Referring now to FIG. 3, a top view illustrating scoop attaching device 100 according to an embodiment of the present invention.

Surrounding part 122 has handle 128 attached thereto in a direction away from body 116, with magnetism attracting part 110 attached at a location on surrounding part 122 spaced from handle 128, magnetism attracting part 110 is formed having flat, vertical surface 112.

Figure 4:
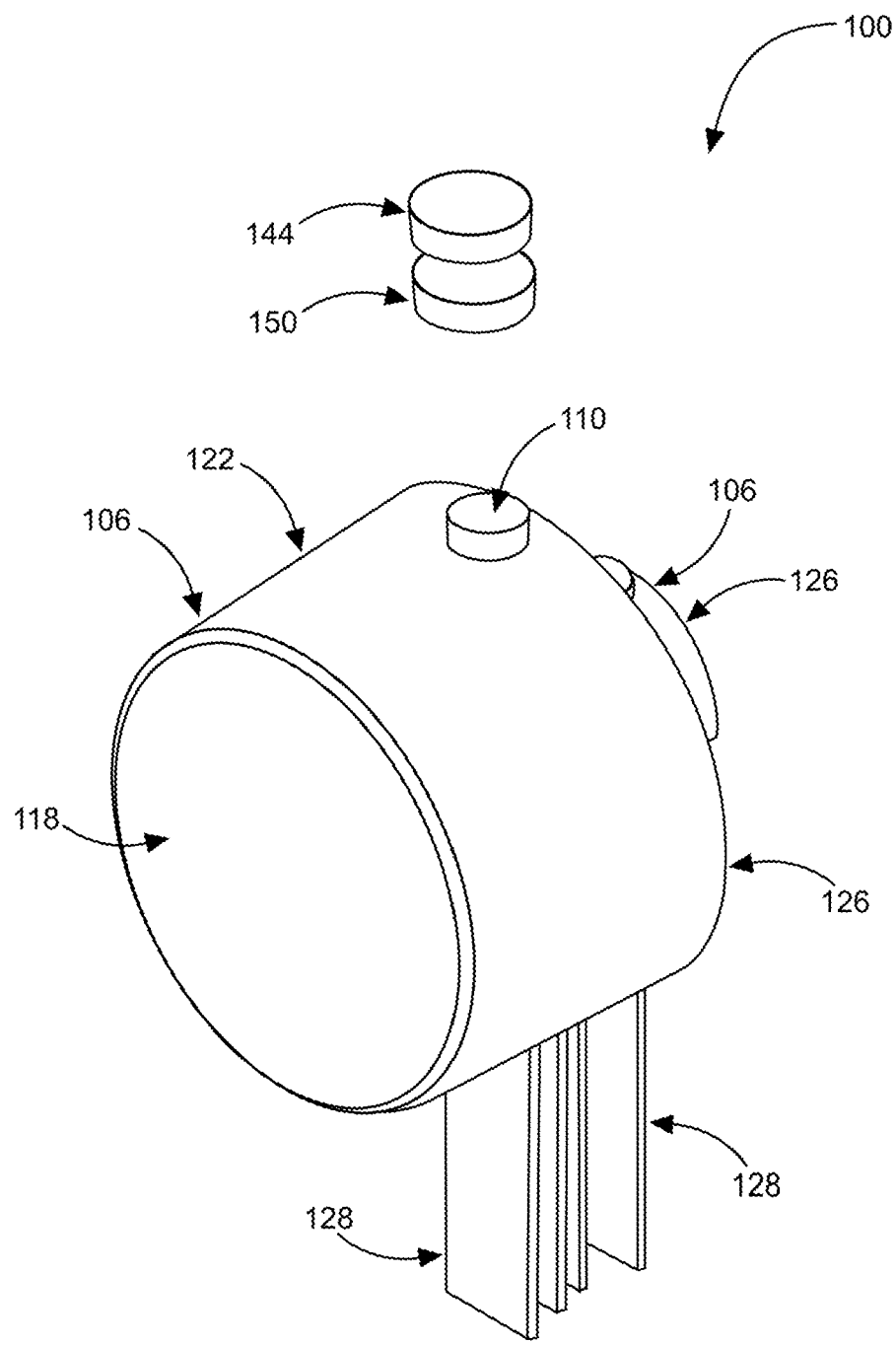
FIG. 4 is a bottom perspective view illustrating scoop attaching device according to an embodiment of the present invention of FIG. 1.

Referring now to FIG. 4, showing a bottom perspective view illustrating scoop attaching device 100 according to an embodiment of the present invention.

Bottom part 118, surrounding part 122, and handle 128 are all formed from plastic material 130. Magnetism attracting part 110 is embedded in, and protruding from surrounding part 122 at spaced intervals. Magnetism attracting part 110 is round, and connected to surrounding part 122 at spaced intervals.

Scoop attaching device 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., for example, including more or less components, customized parts, different color combinations, parts may be sold separately, etc., may be sufficient.

In the preferred embodiment, the scoop attaching device 100 comprises a plurality of scoops 106, wherein each scoop 106 comprises a magnetism attracting part 110 and a body having a bottom part and a surrounding part, wherein the bottom part and the surrounding part constitute a holding part having an opening, wherein each respective magnetism attracting part 110 is attached to a respective outer surface of each respective holding part for each scoop 106, wherein the magnetism attracting part 110 of each of the plurality of scoops 106 are attracted to one another and the magnetism attracting device 140, such that the magnetism attracting part 110 of each of the plurality of scoops 106 are adapted to releasably connect with one another and the magnetism attracting device 140; and wherein the plurality of scoops 106 are formed and adapted to be placed one inside the other, releasably connect with one another, and then be releasably connected to said magnetism attracting device 140, such that the plurality of scoops can be releasably connected to a supporting surface in a stored configuration and individually removed when needed.

It should be noted that each of the magnetism attracting parts 110 and the magnetism attracting device 140 have a magnetic force to thereby be attracted to and releasably attachable to one another.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A scoop attaching device comprising:
   a plurality of scoops, each scoop comprising:
   at least one magnetism attracting part; and
   a body having a bottom part and a surrounding part, said bottom part and said surrounding part constitute a holding part, said holding part has an opening;
   wherein said magnetism attracting part is attached to an outer surface of said holding part;

wherein each said magnetism attracting part of each of said plurality of scoops are attracted to one another; and wherein said plurality of scoops are formed and adapted to be placed one inside the other; and a magnetism attracting device having:
   a first magnetic part and a second magnetic part;
      wherein said first magnetic part and said second magnetic part are magnetically attracted and connected to each other;
      wherein said second magnetic part and said magnetism attracting parts are magnetically attracted and connected to each other;
      wherein there is a first magnetic force between said first magnetic part and said second magnetic part, and there is a second magnetic force between said second magnetic part of said magnetism attracting device and each said magnetism attracting part of each of said plurality of scoops; wherein said first magnetic force is greater than said second magnetic force; and
      wherein said magnetism attracting device is adapted to be releasably connected to a supporting surface;

wherein said plurality of scoops can be placed one inside the other, such that said magnetism attracting part of each of said plurality of scoops are attracted to one another; and wherein said plurality of scoops can then be releasably connected to said magnetism attracting device, such that said plurality of scoops can be releasably connected to said supporting surface in a stored configuration.

2. The scoop attaching device according to claim 1, wherein said surrounding part has a handle attached thereto in a direction away from said body; said magnetism attracting part is set up at a location on said surrounding part spaced from said handle, said magnetism attracting part is formed having a flat surface.

3. The scoop attaching device according to claim 2, wherein said bottom part is formed from plastic material.

4. The scoop attaching device according to claim 2, wherein said surrounding part is formed from plastic material.

5. The scoop attaching device according to claim 2, wherein said handle is formed from plastic material.

6. The scoop attaching device according to claim 2, wherein said magnetism attracting part is embedded to said surrounding part.

7. The scoop attaching device according to claim 2, wherein said magnetism attracting part is protruded to said surrounding part.

8. The scoop attaching device according to claim 2, wherein said magnetism attracting part is attached to said surrounding part.

9. The scoop attaching device according to claim 2, wherein said magnetism attracting part is round.

10. The scoop attaching device according to claim 2, wherein said magnetism attracting part is square.

11. The scoop attaching device according to claim 2, wherein said magnetism attracting device has twice the volume of said magnetism attracting part.

12. The scoop attaching device according to claim 2, wherein said flat surface is vertical to said direction.

\* \* \* \* \*